(No Model.)

W. P. HARRISON.
CHAIN PUMP BUCKET.

No. 318,615. Patented May 26, 1885.

Witnesses:
L. C. Hill
W. B. Masson

Inventor:
William P. Harrison
by E. E. Masson
atty.

UNITED STATES PATENT OFFICE.

WILLIAM P. HARRISON, OF COLUMBUS, OHIO.

CHAIN-PUMP BUCKET.

SPECIFICATION forming part of Letters Patent No. 318,615, dated May 26, 1885.

Application filed December 6, 1883. (No model.)

*To all whom it may concern:*

Be it known that I, WILLIAM P. HARRISON, a citizen of the United States, residing at Columbus, in the county of Franklin and State of Ohio, have invented a new and useful Improvement in Chain-Pump Buckets, of which the following is a specification.

My invention relates to improvements in chain-pump buckets, in which a screw-threaded shank is provided with a tubular rubber bucket adapted to be expanded by internal pressure; and the objects of my invention are, first, to provide a simple and durable rubber bucket at a low cost of manufacture; second, to produce a tubular rubber bucket having its upper end internally screw-threaded and its sides of a uniform thickness, the lower end of which fits closely within the pump-tube, and conforms to any unevenness of the inner surface of the latter without producing excessive wear of the rubber; third, to provide the rubber bucket with a central screw-threaded metal shank, substantially square, having four series of projections extending vertically on the same at equal distance apart and between the threads to permit the rubber bucket to be set in four different positions on the shank for each complete rotation of said bucket, and thus gradually expanding and renewing the surface until entirely worn out. I attain these objects by the construction illustrated in the accompanying drawings, in which—

Figure 1:
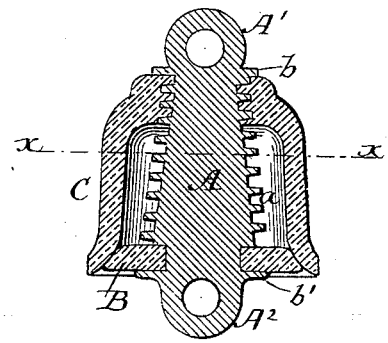
Figure 2:
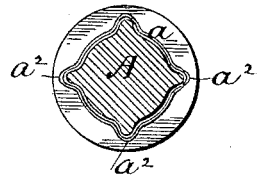
Figure 3:
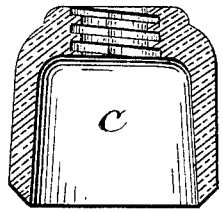

Figure 1 is a transverse section of the bucket and its central shank. Fig. 2 is a transverse horizontal section of the same, taken on the line $x\ x$ of Fig. 1. Fig. 3 is a transverse section of the molded bucket.

In said drawings the shank is represented at A. It is conical in form, and carries a screw-thread, $a$, from near its upper loop, A', nearly to its lower loop, $A^2$. From the base of the upper loop, A', projects a circular metal flange, $b$, which rests upon the curved top of the rubber bucket. The upper portion of the lower loop, $A^2$, is provided with a circular flange, $b'$, and immediately above the latter a circular groove is formed in the shank to receive a washer or disk, B, made of elastic rubber, of suitable diameter to bear against the interior of the lower portion of the bucket.

The rubber bucket C is tubular in shape, and has its top curved inwardly to closely fit around the shank beneath the upper flange, $b$, and said flange prevents the accidental removal of the rubber from its position on the link or shank. This rubber bucket is retained upon the shank and allowed to turn thereon by means of screw-threads cut or molded in the inner surface of the upper portion of the rubber to correspond with the threads upon the shank.

The conical metal shank A is provided between and upon the screw-threads with four series of projections, $a^2$, at equal distance thereon, giving to the same an approximately square periphery. By this construction of a conical screw-shank the buckets C can be made to fit very closely, but not too tightly, within the water-elevating tube, as by means of the corresponding screw-threads and the projections $a^2$ their periphery can be adjusted four times while turning the rubber once around the shank, the said projections acting as temporary locks when impressed into the rubber.

The rubber washer B is of suitable diameter to expand the lower portion of the tubular rubber bucket until it is made to fit closely against the inner wall of the tube.

When the lower portion of the base of the rubber buckets becomes worn with contact with the wall, a quarter-turn of the said rubber on the screw-threaded shank will renew the surface. This operation can be repeated until the entire rubber surface is consumed.

Having now fully described my invention, what I claim, and desire to secure by Letters Patent, is—

1. The conical screw-threaded shank A, having four series of projections, $a^2$, arranged in rows thereon, in combination with loops A' and $A^2$ and washer or disk B, substantially and for the purpose described.

2. The combination of the rubber bucket C with the conical screw-threaded shank A, having projections $a^2$, and flanges $b$ and $b'$ integral therewith, and internal washer or disk, B, substantially as and for the purpose described.

WILLIAM P. HARRISON.

Witnesses:
WILLIAM T. MCCLURE,
D. C. WELLING.